(12) United States Patent
Kalev et al.

(10) Patent No.: US 9,673,680 B2
(45) Date of Patent: Jun. 6, 2017

(54) ELECTROMECHANICAL FLYWHEELS

(71) Applicants: Claude Michael Kalev, Newbury Park, CA (US); Heath F. Hofmann, Ann Arbor, MI (US)

(72) Inventors: Claude Michael Kalev, Newbury Park, CA (US); Heath F. Hofmann, Ann Arbor, MI (US)

(73) Assignee: Rotonix Hong Kong Limited, Newbury Park, CA (US)

( * ) Notice: Subject to any disclaimer, the term of this patent is extended or adjusted under 35 U.S.C. 154(b) by 302 days.

(21) Appl. No.: 14/355,199

(22) PCT Filed: Nov. 13, 2012

(86) PCT No.: PCT/US2012/064892
§ 371 (c)(1),
(2) Date: Apr. 29, 2014

(87) PCT Pub. No.: WO2013/071314
PCT Pub. Date: May 16, 2013

(65) Prior Publication Data
US 2014/0300227 A1    Oct. 9, 2014

Related U.S. Application Data

(63) Continuation-in-part of application No. 13/342,886, filed on Jan. 3, 2012, now Pat. No. 9,148,037, and a
(Continued)

(51) Int. Cl.
*H02K 7/02* (2006.01)
*H02K 7/09* (2006.01)
*F16C 32/04* (2006.01)
*F16F 15/18* (2006.01)
*F16H 33/02* (2006.01)
*H02K 19/20* (2006.01)
*H02K 19/10* (2006.01)

(52) U.S. Cl.
CPC ............. *H02K 7/02* (2013.01); *F16C 32/044* (2013.01); *F16F 15/18* (2013.01); *F16H 33/02* (2013.01); *H02K 7/025* (2013.01); *H02K 7/09* (2013.01); *H02K 19/103* (2013.01); *H02K 19/20* (2013.01); *Y02E 60/16* (2013.01)

(58) Field of Classification Search
CPC .................................. H02K 7/02; H02K 7/09
USPC .......................................... 310/74, 90.5, 184
IPC ............................................... H02K 7/02,7/09
See application file for complete search history.

(56) References Cited

U.S. PATENT DOCUMENTS 3,436,572 A * 4/1969 Storsand ............... F16F 15/315
310/165
5,736,800 A * 4/1998 Iannello ............... F16C 32/0448
310/114
(Continued)

FOREIGN PATENT DOCUMENTS

JP    1996178011    12/1996
JP     199742380    10/1997
(Continued)

*Primary Examiner* — John K Kim
(74) *Attorney, Agent, or Firm* — Paul D. Chancellor; Ocean Law

(57) ABSTRACT

An electromechanical flywheel machine includes a flywheel mass and a motor-generator having a rotor rotatable about a stationery inner stator having stator windings.

12 Claims, 9 Drawing Sheets

Related U.S. Application Data continuation-in-part of application No. 13/343,603, filed on Jan. 4, 2012, now Pat. No. 8,917,004.

(60) Provisional application No. 61/559,128, filed on Nov. 13, 2011, provisional application No. 61/568,126, filed on Dec. 7, 2011.

(56) References Cited

U.S. PATENT DOCUMENTS

| | | | |
|---|---|---|---|
| 5,969,446 A | 10/1999 | Eisenhaure et al. | |
| 6,130,494 A * | 10/2000 | Schob | F16C 32/0463 310/90.5 |
| 6,175,172 B1 | 1/2001 | Bakholdin et al. | |
| 6,236,127 B1 * | 5/2001 | Bornemann | F16C 32/0438 310/178 |
| 6,624,542 B1 | 9/2003 | Gabrys et al. | |
| 7,187,087 B2 * | 3/2007 | Khalizadeh | F16C 32/0442 290/1 R |
| 2009/0134705 A1 * | 5/2009 | Kalev | H02K 7/025 307/68 |
| 2014/0084714 A1 * | 3/2014 | Kalev | H02K 1/2786 310/46 |
| 2014/0300227 A1 * | 10/2014 | Kalev | H02K 7/025 310/74 |

FOREIGN PATENT DOCUMENTS

| | | |
|---|---|---|
| JP | 11-355980 A | 12/1999 |
| JP | 2002130278 | 9/2002 |
| JP | 2002-303257 A | 10/2002 |
| JP | 2004072980 A | 4/2004 |
| RU | 79356 U1 | 12/2008 |
| RU | 97018 U1 | 8/2010 |
| RU | 100861 U1 | 12/2010 |
| SU | 93187 A | 1/1952 |
| SU | 1647773 A1 | 5/1991 |

* cited by examiner

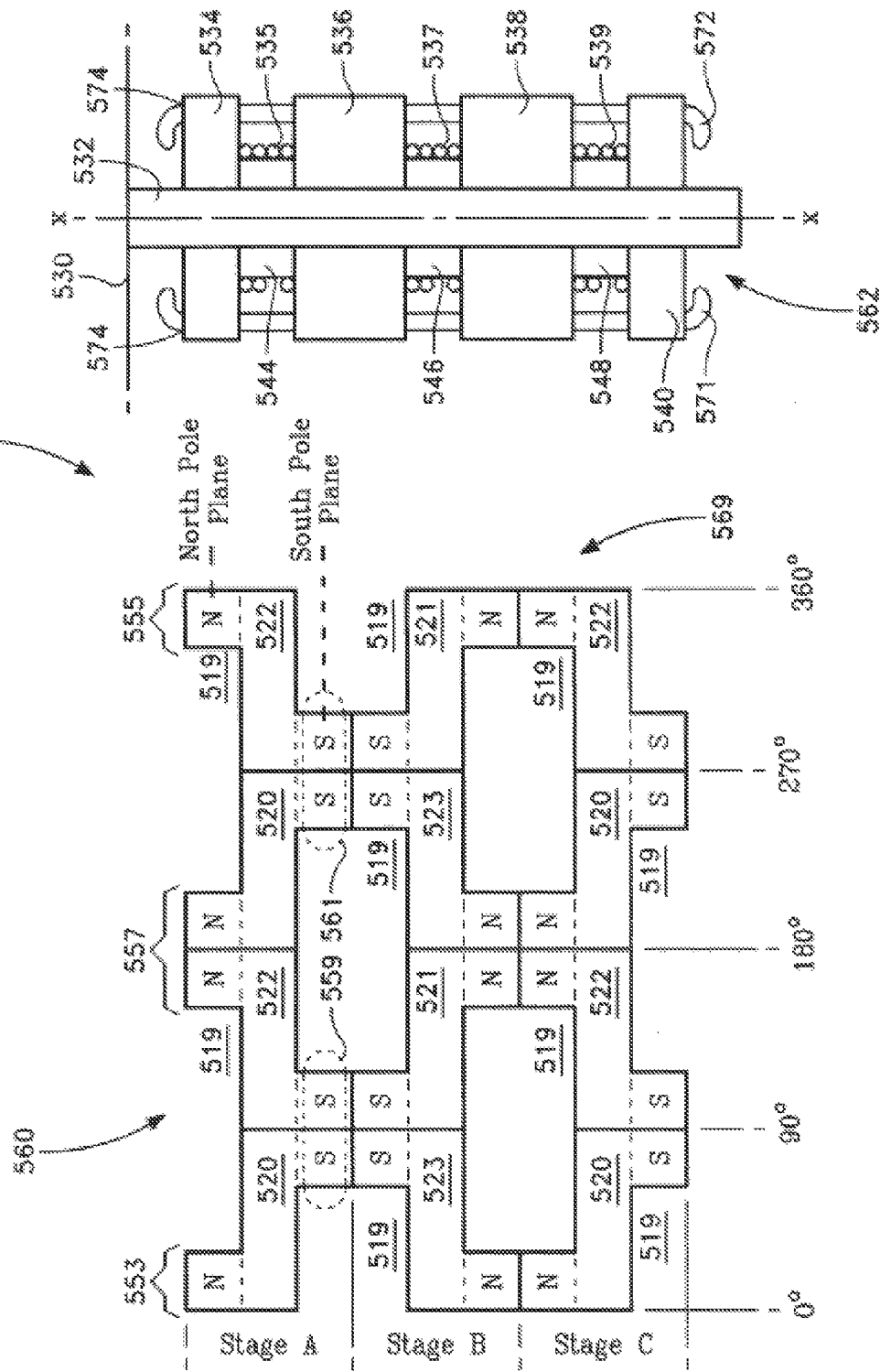

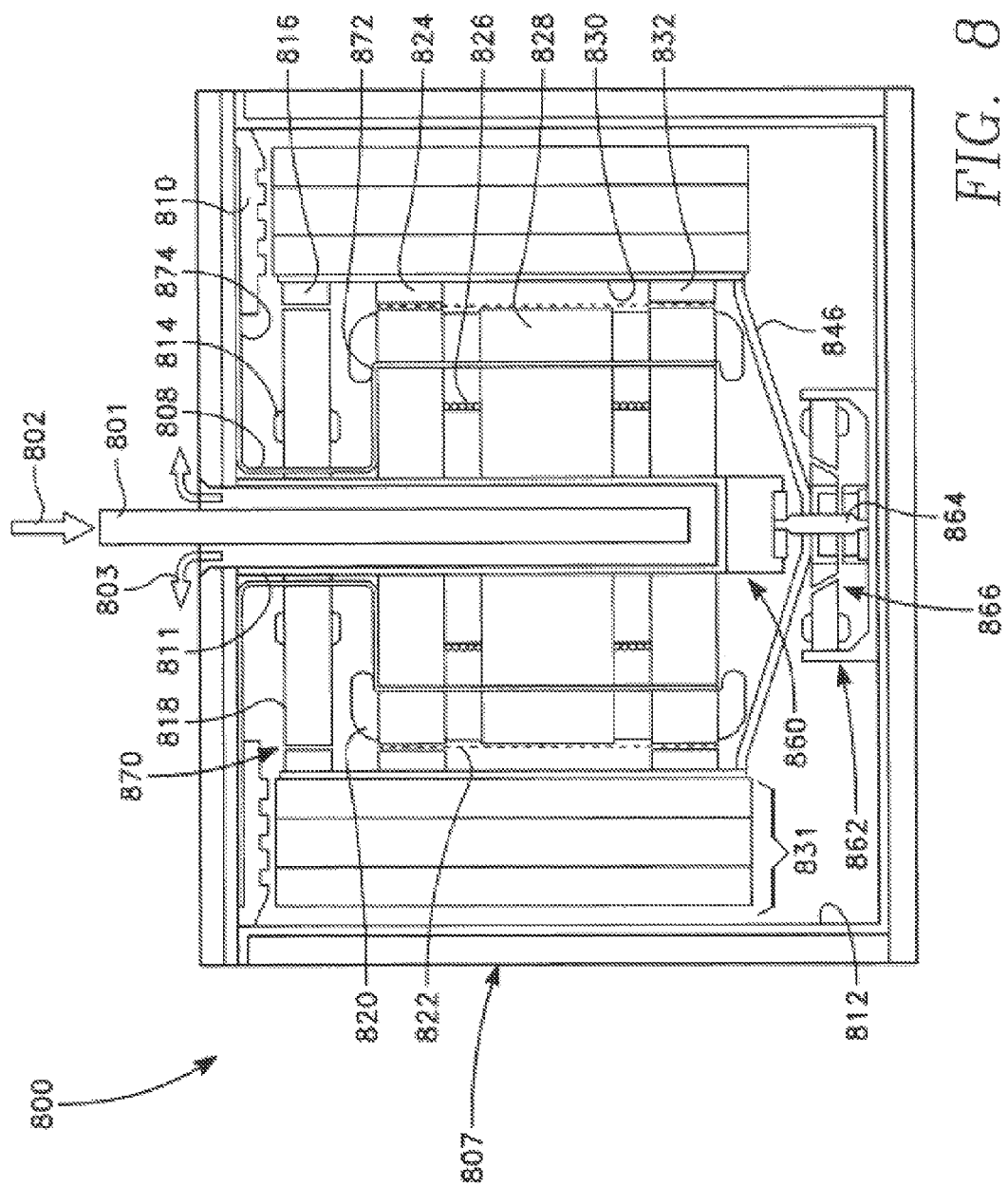

ELECTROMECHANICAL FLYWHEELS

PRIORITY CLAIM

This application claims the benefit of U.S. Prov. Pat. App. No. 61/559,128 filed 13 Nov. 2011 which is incorporated herein in its entirety and for all purposes. This application claims the benefit of U.S. Prov. Pat. App. No. 61/568,126 filed 7 Dec. 2011 which is incorporated herein in its entirety and for all purposes. This application is a continuation in part of U.S. patent application Ser. No. 13/342,886 filed 3 Jan. 2012 which is incorporated herein in its entirety and for all purposes. This application is a continuation in part of U.S. patent application Ser. No. 13/343,603 filed 4 Jan. 2012 which is incorporated herein in its entirety and for all purposes.

BACKGROUND OF THE INVENTION

Known flywheels store kinetic energy, that is, the energy of motion. When called upon to release this energy, the flywheel slows as kinetic energy is depleted. Flywheels driving and driven by electric machines are also know. For decades, such electromechanical machines have been built and have achieved varying degrees of operational success. Widespread application has, however, eluded flywheel manufacturers as even the most advanced commercial machines suffer from significant operational limitations while exceeding the cost of better performing alternatives. Despite persistent efforts by a small flywheel manufacturing industry, modern electromechanical flywheels have found only narrow applications in a few niche markets and presently make no significant contribution to the developed world's energy supply.

FIELD OF INVENTION

This invention relates to the electromechanical arts. In particular, an electromechanical machine incorporating a flywheel mass provides for energy storage and energy release.

DISCUSSION OF THE RELATED ART

Electromechanical flywheels include machines operating under atmospheric conditions and machines operating under evacuated conditions. While machines operating in evacuated environments have benefitted from high speed operation, they have also been limited by available techniques to manage flywheel mass stress, magnetic part temperatures, and safety containment.

SUMMARY OF THE INVENTION

The present invention provides an electromechanical flywheel having a rotor encircling a stator and stator windings including 1) a field winding encircling an axis of rotation defined by the stator and 2) an armature winding that does not encircle the axis of rotation.

In an embodiment, an electromechanical flywheel comprises a core assembly including a motor-generator stator; a motor generator rotor surrounding the stator; the stator defining an axis of rotation, having a field coil that encircles the axis of rotation, and having an armature coil that does not encircle the axis of rotation; a flywheel mass encircles the rotor and is coupled to the rotor for rotation with the rotor; and, an evacuable housing that encloses the flywheel mass.

In various embodiments, the rotor is supported by first and second spaced apart suspension assemblies; the first suspension assembly includes a first electromagnetic bearing for applying centering and levitating forces to the rotor; and, the second suspension assembly includes a second electromagnetic bearing for applying centering forces to the rotor.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

FIG. 5B shows rotor poles and a stator of an electromechanical flywheel machine of FIG. 1.

FIG. 8 shows a third embodiment of the electromechanical flywheel machine of FIG. 1.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Figure 1:
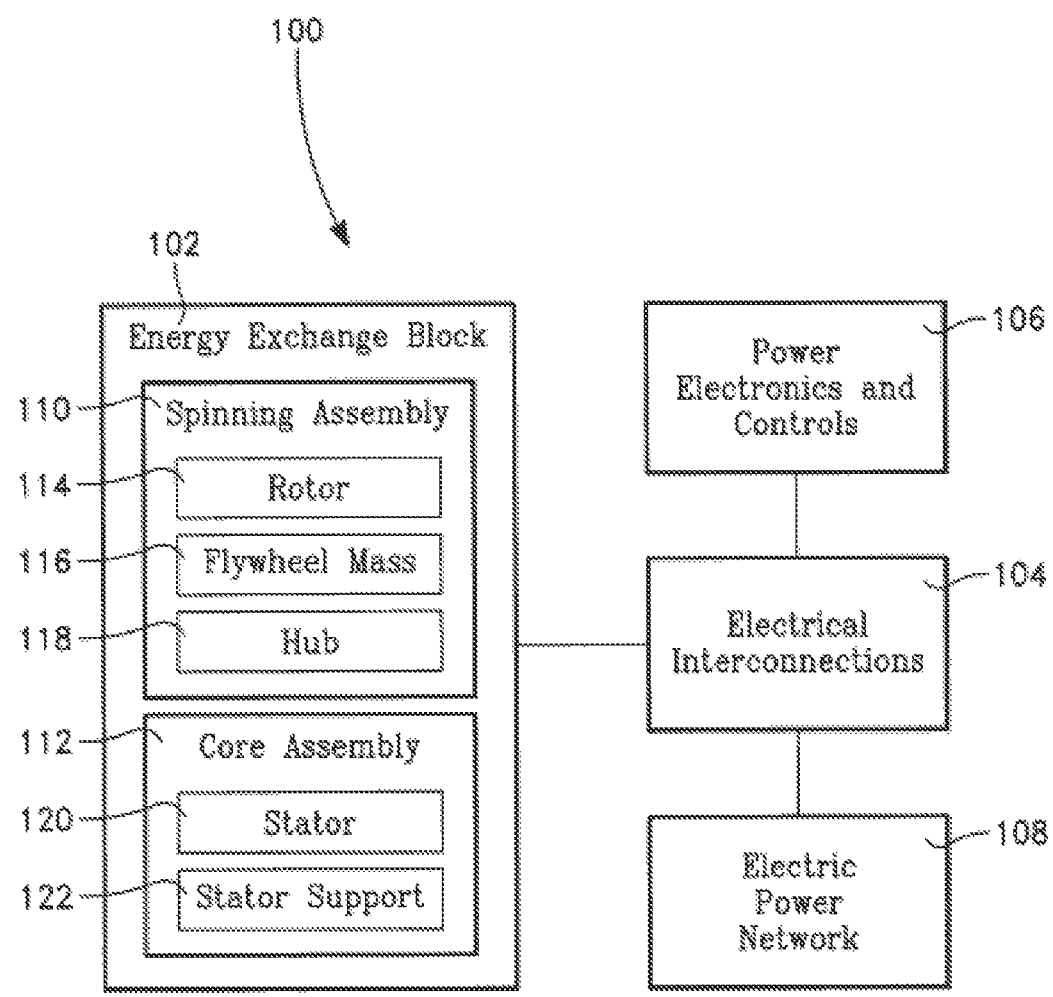
FIG. 1 shows a block diagram of an electromechanical flywheel machine in accordance with the present invention.

FIG. 1 shows an electromechanical flywheel machine 100. Electrical interconnections 104 electrically couple an energy exchange block 102, power electronics and controls 106, and an electric power network 108.

As used herein, unless otherwise stated, the term coupled refers to a direct or indirect connection such as 1) A connected directly to B and 2) C connected indirectly to E via D.

The energy exchange block 102 includes a spinning assembly 110 and a core assembly 112. The spinning assembly includes a motor-generator rotor 114, a flywheel mass 116, and a hub 118. The core assembly includes a motor-generator stator 120 and a motor-generator stator support 122. In various embodiments, the rotor is shaft-less. And, in various embodiments, the spinning assembly is shaft-less.

Electrical interconnections 104 include any of electrical conductor connections, electrical interface devices, electrical transducers, and the like. Power electronics and controls 106 include any of silicon and/or semiconductor devices, analog and digital processors, and related interfaces including human interfaces. The electric power network 108 is 1)

a source of electric power to the energy exchange block 102 in some embodiments, 2) a user of electric power from the energy exchange block in some embodiments, and 3) both a source and a user of electric power to and from the energy exchange block in some embodiments.

Figure 2:
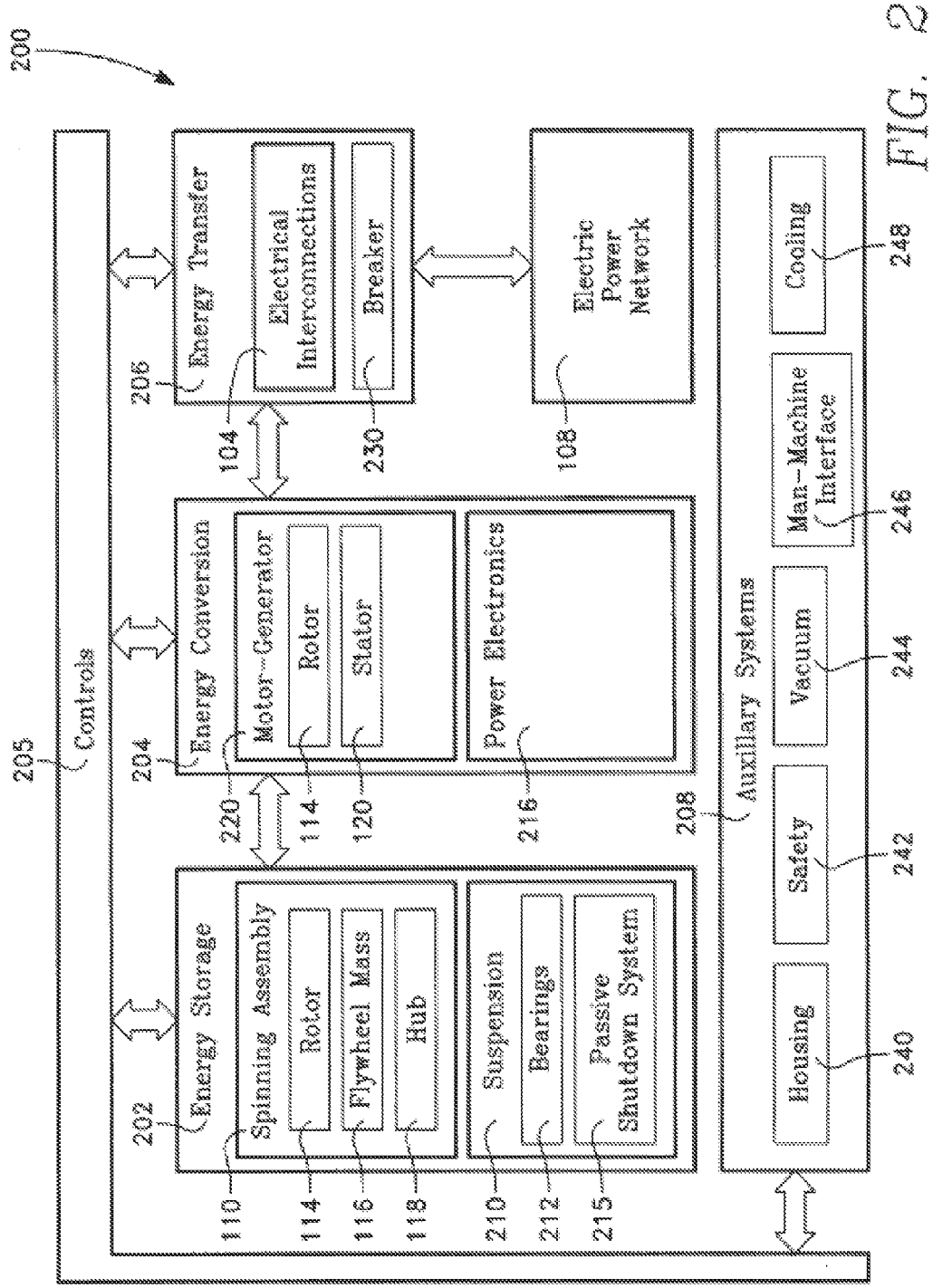
FIG. 2 shows selected functions and equipment of the electromechanical flywheel machine of FIG. 1.

FIG. 2 shows selected electromechanical flywheel machine functions and equipment 200. Energy storage 202 is central to flywheel operation. In electromechanical flywheels, energy storage and energy conversion 204 provide a means for converting kinetic energy to electrical power and/or converting electrical power to kinetic energy. Energy transfer 206 provides for electric power transfers between energy conversion equipment 220, 216 and an electric power network 108. In various embodiments, an electrical switch such a circuit breaker 230 provides for connecting and disconnecting conductors enabling power transfer. In various embodiments, other electromechanical flywheel machine functions include any of several auxiliary support functions 208 described below.

Energy storage 202 utilizes the spinning assembly 110. In various embodiments, a suspension system 210 supports the spinning assembly. Suspension equipment includes bearings or their equivalents 212 and in some embodiments a passive shutdown system 215 supports the spinning assembly in selected operating regimes such as shutdown.

Energy conversion 204 utilizes a means for converting kinetic energy into electrical power such as a generator or a motor-generator. A motor-generator 220 is shown. The motor-generator includes the rotor 114 and a stator 120 and provides a means for rotatably driving the spinning assembly 110 and for being rotatably driven by the spinning assembly. In various embodiments, power electronics 216 enable manipulation of electrical waveforms emanating from the motor-generator and/or the electric power network 108. For example, in various embodiments, power electronics provide for frequency conversion in an AC to AC converter having an intermediate DC bus and power electronics provide for variable speed drive functions such as accelerating the rotational speed of the flywheel rotor.

In various embodiments, auxiliary support functions 208 are carried out by auxiliary support equipment described more fully below. Auxiliary support functions include housing 240, safety 242, vacuum 244, cooling 248, and man-machine interface 246.

A control function 205 provides for one or more of monitoring, assessment, command, and control of other electromechanical flywheel functions. In particular, the control function enables electromechanical flywheel operation via supervision and/or control of one or more of the energy storage 202, energy conversion 204, energy transfer 206, and auxiliary support 208 functions.

Figure 3:
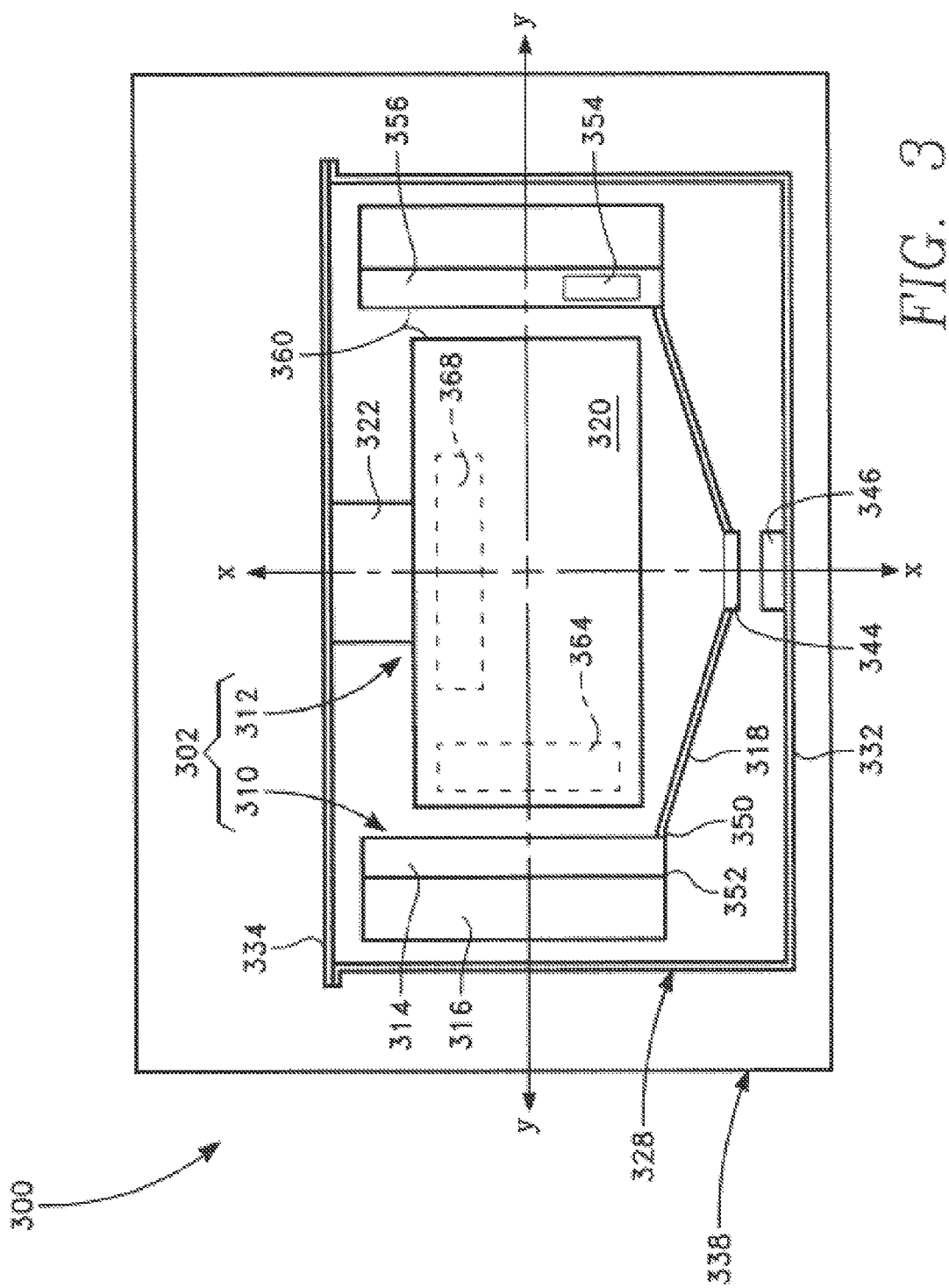
FIG. 3 shows a first embodiment of the electromechanical flywheel machine of FIG. 1.

FIG. 3 shows a first electromechanical flywheel portion 300. An energy exchange block 302 is enclosed by an inner housing 328 which is in turn enclosed by an optional outer housing 338.

The energy exchange block 302 includes a spinning assembly 310 and a core assembly 312. Included in the spinning assembly is a motor-generator rotor 314 and a flywheel mass encircling and coupled to the rotor 316, a hub 318 coupled to the flywheel mass, and a moving suspension element 344. In some embodiments, a sleeve such as a non-magnetic sleeve (e.g., non-magnetic metal alloys and super-alloys) is interposed between the rotor and the flywheel mass for, inter alfa, backing the rotor and providing support to the rotor. The rotor, flywheel mass, hub, and moving suspension element are for rotation in synchrony about an axis x-x and in various embodiments the hub is attached to one or both of the rotor 350 and the flywheel mass 352. Opposite the moving suspension element is a stationery suspension element 346 with a support such as a first wall of the inner housing 332. Included in the core assembly 312 are a stator 320 and a stator support 322. In some embodiments the stator support is coupled to a wall of the inner housing such as a second wall of the inner housing 334.

Encircling the motor-generator stator 320 is the motor-generator rotor 314. In various embodiments, the rotor 314 includes magnetic 354 and nonmagnetic 356 portions and, in some embodiments, the nonmagnetic portion is or includes blocking or matrix material supporting the magnetic portions. In an embodiment, the magnetic rotor portions are laminated structures.

In various embodiments the stator 320 includes a magnetic structure with one or more interengaged coils having electrically conductive windings capable of carrying variable currents and thereby varying the magnetic flux of the magnetic structure. In some embodiments, a first stator coil 364 encircles an imaginary y-y axis that is about perpendicular to the x-x axis. And, in some embodiments, a second stator coil 368 encircles the x-x axis. In an embodiment, a plurality of first stator coils encircle respective imaginary y-y axes and one or more second stator coils encircle the x-x axis, the first stator coils being armature coils and the second stator coils being field coils.

And, in an embodiment, the motor-generator 360 is a homopolar electric machine with the illustrated inside-out arrangement (rotor encircles stator) wherein a) a rotatable rotor similar to rotor 314 includes coil-less, laminated magnetic structures, b) wherein a stationery central stator similar to stator 320 includes laminated magnetic structures with coils for creating a magnetic flux in the magnetic structures and c) the rotor encircles the stator.

Figure 4:
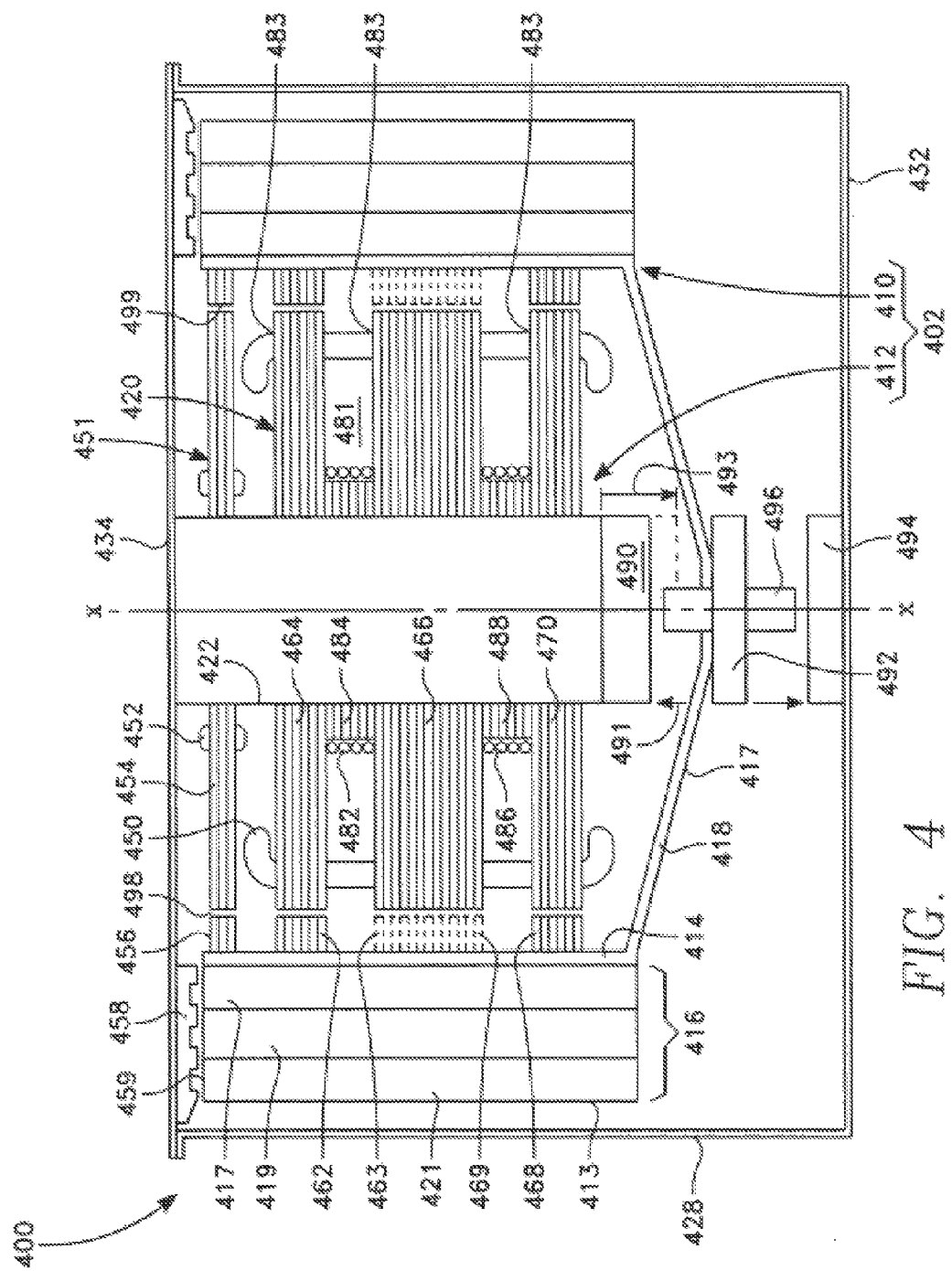
FIG. 4 shows a second embodiment of the electromechanical flywheel machine of FIG. 1.

FIG. 4 shows a second electromechanical flywheel portion 400. An energy exchange block 402 is enclosed by an inner housing 428 which is enclosed, or partially enclosed, in some embodiments, by an outer housing (not shown).

The energy exchange block 402 includes spinning assembly 410 and a core assembly 412. Included in the spinning assembly are a motor-generator rotor 414, a flywheel mass encircling and coupled to the rotor 416, a hub 418 coupled to the flywheel mass 416, a support pin 496 for supporting the hub, and a moving suspension assembly 492 for supporting the hub. Some embodiments include a sleeve such as a non-magnetic sleeve between the rotor and the flywheel mass.

In various embodiments, the flywheel mass 416 includes layers of different materials such as fiberglass in one or more types or grades and carbon fiber in one or more types or grades. U.S. Pat. No. 6,175,172 filed Aug. 4, 1997 and entitled HUB AND CYLINDER DESIGN FOR FLYWHEEL SYSTEM FOR MOBILE ENERGY STORAGE is incorporated by reference herein in its entirety and for all purposes including flywheel mass construction techniques and materials shown in FIG. 4A and the related description.

As shown, the flywheel mass includes three layers with a first layer 417 adjacent to the rotor, an intermediate layer 419, and an outer layer 421. In an embodiment, the intermediate and outer layers include carbon fiber materials and the inner layer includes fiberglass. In another embodiment, all three layers are substantially made from carbon fiber materials. In various embodiments, one or more layers are pre-stressed such as by winding fibers under tension to form substantially cylindrical shell(s) with inherent compressive stress.

The support pin, moving suspension assembly and hub are concentrically arranged and are for rotation in synchrony about an axis x-x. As seen, the support pin 496 is located in a gap 491 between upper and lower bearing carriers 490, 494. Extending from the stator support 422 is an upper bearing carrier and supported from a first wall of the housing 432 is a lower bearing carrier. In an embodiment, elongation of the upper bearing carrier along the x-x axis 493 serves to rotatably restrain the support pin between the upper and lower bearing carriers. In this sense, the upper and lower bearing carriers provide a means to "capture" the spinning assembly 410 via the support pin and are useful for functions including passive shutdown. In various embodiments, the lower bearing carrier and the moving suspension assembly incorporate a first electromagnetic bearing.

A second electromagnetic bearing 451 is spaced apart from the upper and lower bearing carriers 490, 494. The second electromagnetic bearing includes a fixed bearing stator 454 supported by the stator support 422 and electrical windings 452 for magnetizing the stator and a geometrically opposing rotor 456 coupled to the rotor. As shown, the mating faces of the electromagnet 498, 499 are parallel to the x-x axis such that electromagnetic bearing forces are perpendicular to the x-x axis. In other embodiments, angled electromagnetic bearing faces such as those described infra provide electromagnetic bearing force components along an axis parallel to the x-x axis and along an axis perpendicular to the x-x axis. Electromagnets moving with the rotor and in particular electromagnets used in electromagnetic bearings may have solid or laminated electromagnetic cores. In some embodiments the electromagnetic core comprises a resin matrix such as an epoxy matrix wherein finely steel particles are embedded to form a composite electromagnetic core. Such a core tends to reduce a magnetic diffusion time constant associated with electromagnetic core, for example the thickness of the core perpendicular to the generated magnetic field, to reduce the time interval between a current being applied and a force being exerted. This composite technique may be used to provide performance that is otherwise not easily obtained due to unavailability of high strength steel laminations with a suitably thin dimension.

Included in the core assembly 412 is a stator 420 and a stator support 422 coupled to a second wall of the inner housing 434. Encircling the motor-generator stator is the motor-generator rotor 414. In various embodiments, the rotor includes magnetic and nonmagnetic portions (e.g., see 354, 356 of FIG. 3) and, in some embodiments, the nonmagnetic portion is or includes blocking or matrix material supporting the magnetic portions. In an embodiment, the magnetic rotor portions are laminated structures.

In various embodiments, the stator 420 includes a magnetic structure with one or more interengaged coils having electrically conductive windings capable of carrying variable currents and thereby varying the magnetic flux of the magnetic structure.

In an embodiment, a stator such as a homopolar stator includes at least two peripheral rims and one smaller intermediate rim. The rims include a magnetic material such as iron and in various embodiments the rims are laminated structures with each laminate having a substantially annular shape.

As shown, the stator 420 includes three large diameter rims 464, 466, 470 and two smaller diameter rims 484, 488 such that substantially annular or somewhat doughnut shaped pockets 481 are formed between the large diameter and the small diameter rims. It is in these pockets that coils encircling the rotational axis x-x are placed to form field windings 482, 486. In addition to the field coil(s), the stator also includes armature coils.

Armature coils 450 are interengaged with slots 483 in the periphery of the large rims 464, 466, 470 such that each armature coil will encircle an imaginary axis y-y that is substantially perpendicular to the axis of rotation x-x (see FIG. 3).

For each stator rim, there is a plurality of mating rotor poles. As can be seen, the peripheral stator rims 464, 470 have axially spaced (x-x) mating rotor pole 462, 468 (shown in solid lines) and the central stator rim 466 has axially adjacent mating rotor poles 463, 469 (shown in broken lines). Rotor poles for adjacent rims (e.g., 462, 463) are not only axially spaced (x-x), but they are also radially spaced such that a rotor pole for one rim is radially spaced by 90 electrical degrees from the closest rotor pole mating with an adjacent rim.

In various embodiments, internal vacuum pumps such as molecular drag pumps provide for moving molecules away from the flywheel mass 416 and especially away from the flywheel mass periphery where the highest speeds are achieved. U.S. Pat. No. 5,462,402 FLYWHEEL WITH MOLECULAR PUMP is incorporated by reference herein in its entirety and for all purposes including its discussion of molecular drag pumps and their use into flywheel systems.

In an embodiment, a first vacuum pump is formed by a stationery labyrinth like ring 458 supported from the housing wall 434 which is closely spaced with respect to a vacuum pump surface of the flywheel mass 459. In various embodiments grooves in the labyrinth ring provide for a pumping action in concert with the moving flywheel surface. In some embodiments, the groove is a spiral having a cross-sectional area that generally decreases along a forward flow path. And, in some embodiments, a second vacuum pump is formed by a labyrinth similar to the one described above and fixed to peripheral stator parts (such as the large diameter stator rings 454, 464, 466, 470, not shown for clarity) or fixed to geometrically opposed rotor poles (456, 462, 463, 469, 468). In an embodiment, a alterative second drag pump is formed by a labyrinth and moving surface at a periphery of the flywheel mass 413; for example, a labyrinth located on or integral with the housing 428 and a periphery of the flywheel mass operating in close proximity to the labyrinth and establishing an evacuating flow in a direction about perpendicular to the direction of flow established by the first drag pump (peripheral labyrinth not shown). In various embodiments, such an alternative second drag pump is operable with the first drag pump to provide a two-stage drag pump.

In an embodiment, a supply region and an exhaust region are included within the evacuable housing. The supply region has a boundary defined at least in part by portions of a housing 428, a hub exterior surface 417, and a flywheel mass periphery 413. The exhaust region has a boundary defined at least in part by portions of the vacuum barrier housing and the core assembly 412. A first drag pump is interposed between a flywheel mass surface 459 and the vacuum barrier housing wall 434 and a second drag pump is interposed between at least one stator ring 466 and the rotor 414.

Figure 5A:
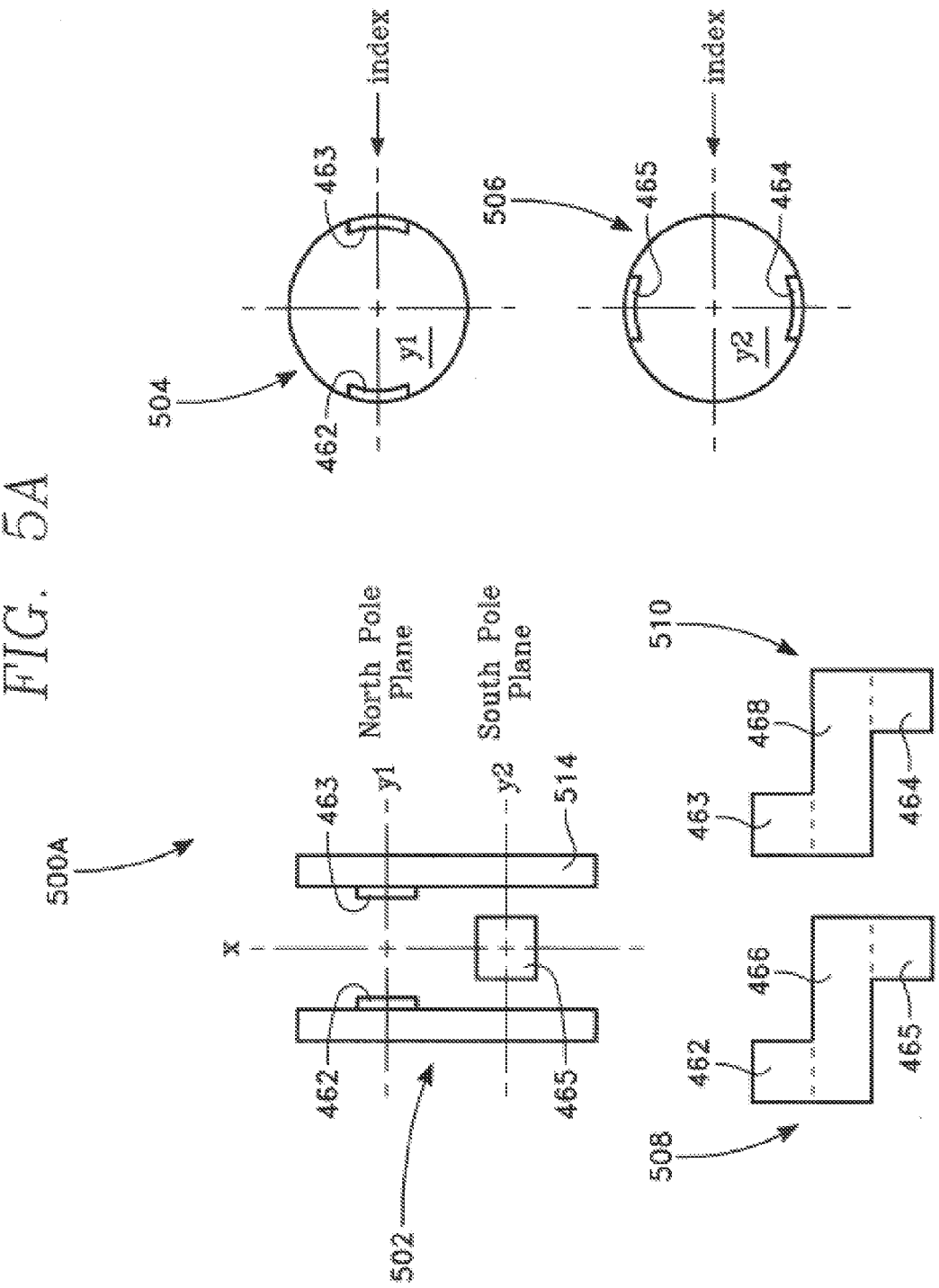
FIG. 5A shows rotor poles of an electromechanical flywheel machine of FIG. 1.

FIG. 5A shows a radially staggered arrangement of rotor poles in adjacent pole planes for a 2+2 pole single stage homopolar machine 500A. Referring to rotor cross section 502 and rotor 514, a first pole 462 is located in a first pole plane Y1 and an opposed pole 463 in located in the same plane. In a similarly clocked adjacent pole plane Y2, an adjacent plane pole 465 is between the Y1 plane poles. Not shown in this cross section is the second pole in the Y2 plane 464.

The plane views 504, 506 of the pole planes Y1, Y2 show the poles in each pole plane 462, 463 and 464, 465 are separated by a 90° geometric angle. In this 4 pole embodiment, the poles are similarly separated by 90 electrical degrees.

In various embodiments, a magnetic path extends between adjacent staggered poles. For example, as shown in the pole assemblies 508, 510, magnetic path parts 466, 468 extend between pole pairs 462, 463 and 463, 464. As shown here, two continuous magnetic paths are formed in a 4 pole machine rotor by magnetic path parts 462-466-465 and 463-468-464. In some embodiments, each magnetic path part assembly 462-466-465 and 463-468-464 is "Z" shaped with the central members 466, 468 meeting adjoining members 462, 465 and 463, 464 at substantially right angles. Among other things, this structure preserves the capacity of the magnetic path.

FIG. 5B shows a rotor and a stator for a three stage machine, each stage having four poles 500B. Here, a view of rotor magnetic path part assemblies 560 is shown as if the normally cylindrical rotor structure is "unrolled" such that a planar surface is presented. The magnetic path part assemblies 520, 522, 523, 521 are arranged to create a lattice 569 with spaces between the parts 519, the spaces being filled, in various embodiments, with non-magnetic material(s).

The lattice 569 is constructed such that a plurality of stages A, B, C is formed, each stage having 4 poles. For example, stage A has a North plane with a first full pole 557 and a second pole consisting of two half-poles 553, 555. Stage A also has a South plane with two full poles 559, 561. The North and South planes of Stage A therefore have a total of 4 complete poles.

Each stage includes four magnetic path part assemblies or rotor lattice parts. For example, Stage A includes magnetic path part assemblies 520, 522, 520, and 522; Stage B includes magnetic path part assemblies 523, 521, 523, and 521; and Stage C, like Stage A, includes magnetic path part assemblies 520, 522, 520 and 522. In some embodiments, the path part assembly geometry differs primarily in part orientation when curvature is not considered. Here, for example, assembly 520 differs from assembly 522 by an 180° rotation about an axis parallel to the x-x axis, assembly 520 differs from assembly 523 by an 180° rotation about an axis perpendicular to the x-x axis, and assembly 522 differs from assembly 521 by an 180° rotation about an axis perpendicular to the x-x axis.

Also shown is a cross sectional view of a stator 562. As seen, the stator has large 534, 536, 538, 540 and small 544, 546, 548 diameter rims centered on an x-x axis. First and second large diameter intermediate rims 536, 538 are interposed between large diameter peripheral rims 534, 540. One small diameter rim is interposed between each pair of large diameter rims such that the rims are stacked in an order 534, 544, 536, 546, 538, 548, and 540. The rims are supported by a coupled stator support 532 that is supported via a wall 530.

A plurality of armature windings eg. 571, 572 interengage a plurality of the large diameter rim peripheries eg. 574 via slots or a similar feature. Field windings 535, 537, 539 encircle the stator axis of rotation x-x with one field winding encircling each of the small diameter rims such that each field winding is between a pair of large diameter rims.

As can be seen, the lattice structure of the rotor 569 is arranged such that the first rim of the stator 534 corresponds to the North poles of stage A; the third rim of the stator 536 corresponds to the South poles of stage A and the South poles of stage B; the fifth rim of the stator corresponds to the North poles of stage B and the North poles of stage C; and, the seventh rim of the stator corresponds to the South poles of stage C.

In various embodiments, bearings are used to support the spinning assembly and the included flywheel mass 116, 316, 416. Any combination of the bearings described herein that is sufficient to support the spinning assembly may be used.

Figure 6:
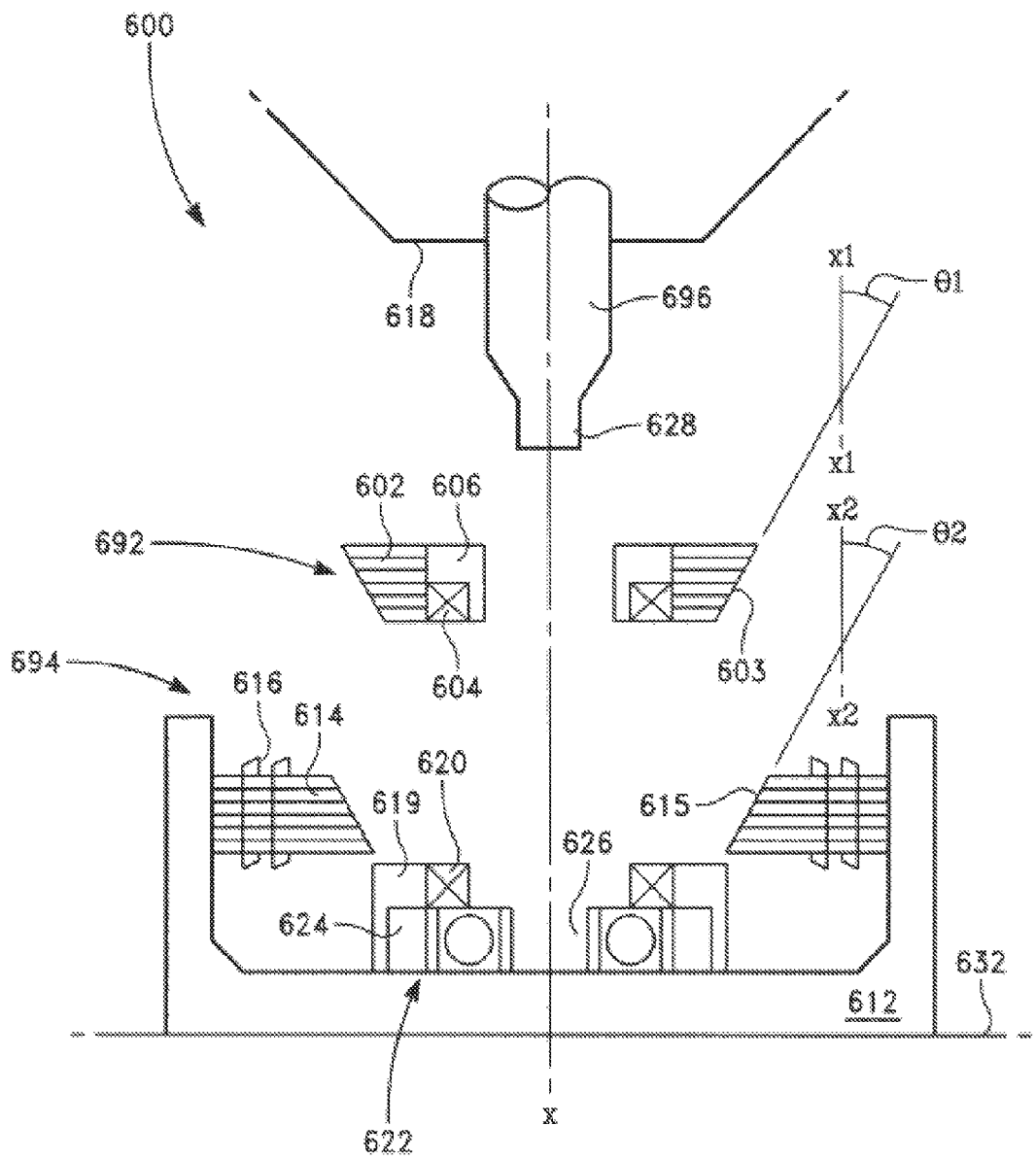
FIG. 6 shows a lower bearing assembly and parts of an electromechanical flywheel machine of FIG. 1.

FIG. 6 shows a lower bearing carrier and some related parts 600. As shown in the upper half of the drawing, there is a hub 618 for coupling to a flywheel mass, a support pin 696 for supporting the hub 618, a moving suspension assembly for supporting the hub 692, and a lower bearing carrier 694. The hub, support pin, and moving suspension assembly are fixedly coupled together (shown in FIG. 6 in exploded diagram format for clarity).

In various embodiments, the moving suspension assembly 692 includes a moving suspension assembly electromagnetic bearing rotor 602. In some embodiments, the bearing rotor is a laminated structure (as shown). In some embodiments, the bearing has a moving suspension assembly electromagnetic bearing face 603 oriented at an angle θ1=0° where the angle is defined by the face and an axis x1-x1 parallel to the x-x axis. And, in some embodiments, the bearing has a face 603 oriented at an angle 0<θ1<90° ("angled face") (as shown) providing electromagnetic bearing force components parallel to the x-x axis and parallel to an axis perpendicular to the x-x axis.

In various embodiments, the moving suspension assembly 692 includes a moving suspension assembly permanent magnet 604 and in some embodiments the permanent magnet is in addition to the electromagnetic bearing rotor 602. And, in some embodiments, a moving suspension assembly magnet holder 606 provides a holder for either or both of the moving suspension assembly electromagnetic bearing rotor and the moving suspension assembly permanent magnet.

When the moving suspension assembly includes an electromagnetic bearing rotor 602, the lower bearing carrier 694 includes a corresponding lower bearing carrier electromagnetic bearing stator 614 and a lower bearing carrier stator electrical coil 616 for magnetizing the stator. The stator is supported by a lower bearing carrier frame 612 which is in turn supported by a housing wall 632.

In some embodiments, the bearing stator is a laminated structure (as shown). In some embodiments, the bearing has a lower bearing carrier electromagnetic bearing face 615 oriented at an angle θ2=0° where the angle is defined by the face and an axis x2-x2 parallel to the x-x axis. And, in some embodiments, the bearing has a face 615 oriented at an angle 0<θ2<90° ("angled face") (as shown) providing electromagnetic bearing magnetic force components parallel to the x-x axis and parallel to an axis perpendicular to the x-x axis. As will be appreciated by persons of ordinary skill in the art, the bearing faces 603, 615 interoperate such that a straight rotor face is matched with a straight stator face while an angled rotor face is matched with an angled rotor face.

Where a moving suspension assembly permanent magnet is used 604, the lower bearing carrier includes a geometrically opposed permanent magnet 620. In some embodiments a lower bearing carrier permanent magnet holder 619 supported from the lower bearing carrier frame 612 and supporting the permanent magnet.

In various embodiments, the lower bearing carrier 694 includes a lower bearing carrier landing bearing such as an antifriction bearing 622. As shown, the landing bearing is supported from the lower bearing carrier frame 612. In some embodiments, a damping material 624 provides a seating material for the landing bearing.

Figure 7:
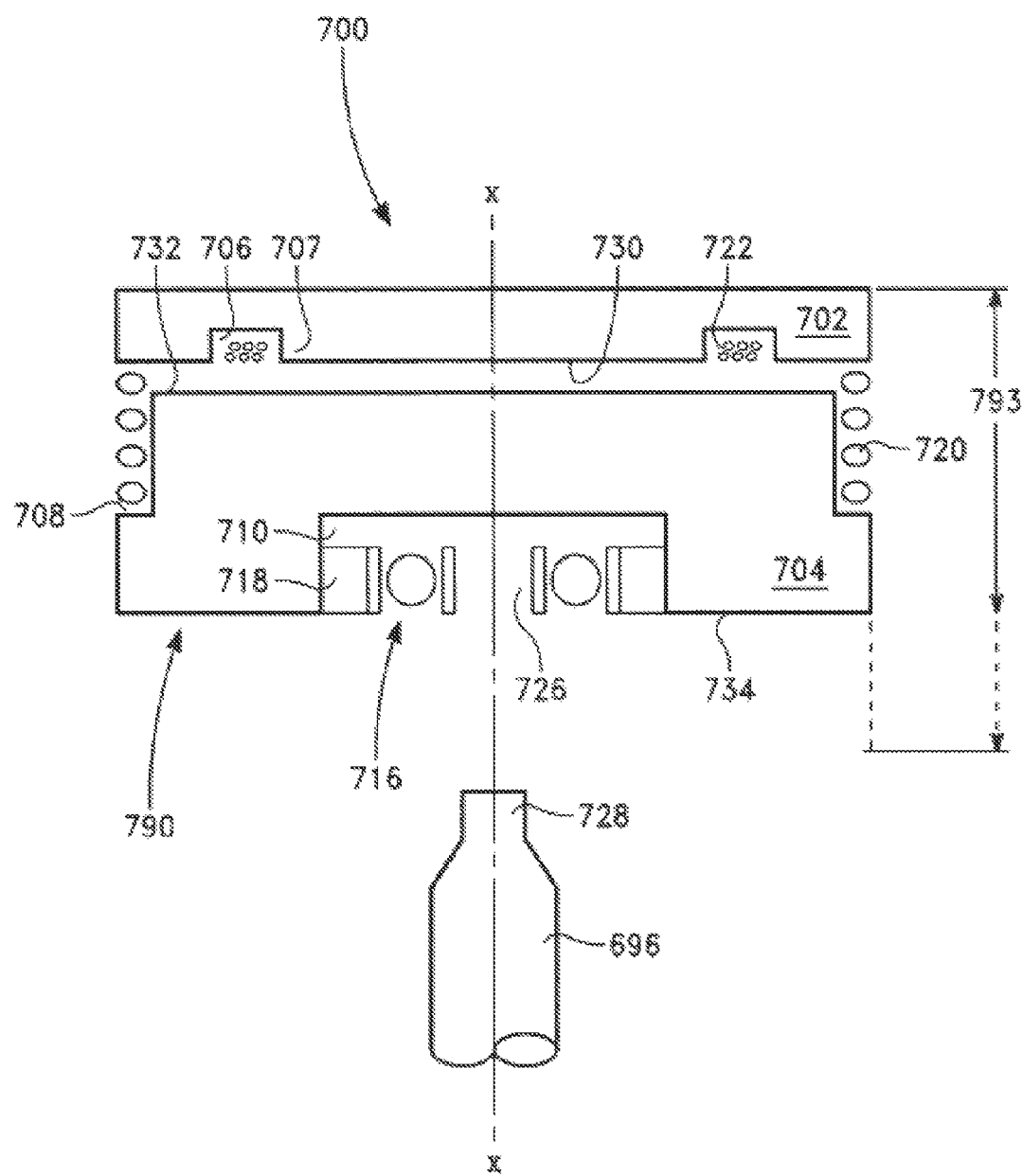
FIG. 7 shows an upper bearing assembly and parts of an electromechanical flywheel machine of FIG. 1.

FIG. 7 shows an upper bearing carrier and some related parts 700. As shown, the upper bearing carrier 790 includes a stationery plate 702 and a moving plate 704.

The stationery plate 702 includes a coil space 706 in the form of a groove is on a side of the stationary plate facing the moving plate 730. An electrical coil 722 for magnetizing a magnetic material surrounded by the coil 707 is included.

The moving plate 704 includes a spring space 708 and a mechanical bearing space 710. The spring space 708 is formed where a reduced diameter section of the moving plate extends to the side of the plate facing the stationery plate 732 and a spring such as a coil spring 720 occupies this space. The bearing space 710 is a central cavity in a moving plate surface 734 opposite the moving plate surface facing the stationery plate 732. As seen, operation of this electromagnet compresses the spring and tends to draw the plates together.

In various embodiments, the upper bearing carrier 790 includes an upper bearing carrier landing bearing such as an antifriction bearing 716. As shown, the landing bearing is positioned in the moving plate cavity 710. In some embodiments, a damping material 718 provides a seating material for the landing bearing.

As seen in FIGS. 6 and 7, the support pin 696 extends between the upper bearing carrier 790 and the lower bearing carrier 694. Further, each of the upper bearing carrier landing bearing 716, support pin 696, moving suspension assembly 692, lower electromagnetic bearing stator 614, lower bearing carrier permanent magnet 620, and lower bearing carrier landing bearing 622 is centered on the x-x axis such that when the moving plate 704 moves toward the lower bearing carrier 793, the support pin upper and lower ends 728, 628 are engaged with respective upper and lower landing bearings 716, 622 and a central aperture of each landing bearing 726, 626.

FIG. 8 shows another embodiment of an electromechanical flywheel 800. A flywheel mass 831 surrounds and is coupled to a homopolar motor-generator rotor including a metallic liner 830. As shown, the rotor includes rotor North rotor poles 824, 832. Not shown are the South rotor poles; see stages A and B of FIG. 5B for a similar arrangement that locates the South rotor poles.

A stator support 811 is coupled to a motor-generator stator 828 and each of field windings 826 and armature windings 820 are interengaged with the stator in a manner similar to that described above.

Supporting the rotor 830 and flywheel mass 831 is a hub 846 that is in turn supported by a support pin 864 engaging and/or located between upper and lower bearing carriers 860, 862. See FIGS. 6 and 7 for details of similar bearing carriers. A first electromagnetic bearing 866 is located in the lower bearing carrier. A second electromagnetic bearing 870 is spaced apart from the first and second bearing carriers and includes a bearing stator 818, a bearing rotor 818 and stator coils 814 for magnetizing the stator.

An electromechanical flywheel housing includes an inner vacuum barrier 812. In some embodiments, an outer housing 807 supports the vacuum barrier. Suitable vacuum barrier materials include stainless steel and other materials known by skilled artisans to be suited to this purpose.

In various embodiments, the stator support 811 has a tubular structure and a coaxial tube 801 is located therein. As shown, the coaxial tube envelops a liquid coolant flow entering the stator support 802 and an annulus between the support structure inside diameter and the coaxial tube outside diameter 815 provides a flow path for coolant leaving the stator support 803. Coolant traveling through the annulus absorbs heat from the stator 828 and is in various embodiments cooled in a cooler (not shown) before it is pumped (not shown) back into the flow entry 802.

Heat pipes 808 provide stator cooling in some embodiments. As shown, each of a plurality of heat pipes has a heat absorbing first end in close proximity to the stator, such as in the stator armature winding slots (as shown) 872. The heat rejecting end of the heat pipe is in close proximity to the vacuum barrier, such as in contact with vacuum barrier (as shown) 874 or in other embodiments cooled by the above mentioned liquid coolant flow.

In operation, a flywheel mass of the electromechanical flywheel is accelerated by the motor-generator during flywheel charging. During charging, energy is transferred to the motor-generator. During discharge, the motor-generator converts the kinetic energy of the flywheel into electrical energy as the flywheel mass is decelerated. Power electronics provide for conversion of network electric power in order to motor the motor-generator and the mechanically coupled flywheel mass. Power electronics also provide for conversion of motor-generator generated electric power into a waveform suited for use by the electrical network to which the electric power is transferred.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A flywheel assembly comprising:
   a flywheel surround assembly including a space for receiving a flywheel mass, the assembly defining upper and lower support planes:
   a motor-generator stator hanging from the upper plane, defining an axis of rotation, having a field coil encircling the axis, and having an armature coil about perpendicular to the field coil;
   a hollow motor-generator rotor in the form of a cylinder with an open end and an opposite end coupled to a hub;
   the rotor open end receiving the stator into the rotor hollow, the rotor for rotation about the axis;
   the flywheel mass surrounding and coupled to the rotor;
   a lower electromagnetic bearing (EMB1) supported from the lower plane, EMB1 for exerting uplifting and centering forces on the rotor;
   an upper electromagnetic bearing (EMB2) supported from the upper plane, EMB2 for exerting centering forces on the rotor,
   a plurality of three or more stator rings (SR1, SR2, SR3 . . . ), each ring encircling the axis and the plurality of rings having a slotted periphery;
   the field coil located between a pair of rings;
   the armature coil interengaged with slots in each of the rings;
   at least three stator rings (SR1, SR2, SR3);
   between a first pair of adjacent stator rings (SR1, SR2), each one of a first plurality of pole assemblies for completing a magnetic path therebetween; and, between a second pair of adjacent stator rings (SR2, SR3), each one of a second plurality of pole assemblies for completing a magnetic path therebetween;

wherein no magnetic path exists between pole assemblies in the first plurality of pole assemblies and no magnetic path exists between pole assemblies in the second plurality of pole assemblies.

2. The flywheel assembly of claim 1 wherein the pole assemblies are affixed to a non-magnetic support structure.

3. The flywheel assembly of claim 2 wherein the hub includes a conical transition piece.

4. The flywheel assembly of claim 3 further including a drag pump situated within the evacuable space.

5. The flywheel assembly of claim 4 wherein the stator includes a stator ring that is an electromagnetic bearing stator.

6. The flywheel assembly of claim 5 wherein the rotor includes an electromagnetic bearing rotor.

7. The flywheel assembly claim 1 further comprising:
multiple rotor stages spaced apart along the axis;
viewed with the axis of rotation oriented horizontally,
in a first stage a first "Z" shaped pole assembly adjacent to a first "S" shaped pole assembly and in a second stage a second "S" shaped pole assembly adjacent to a second "Z" shaped pole assembly;
the first "Z" shaped pole assembly adjacent to the second "S" shaped pole assembly; and,
the first "S" shaped pole assembly adjacent to the second "Z" shaped pole assembly;
wherein each pole assembly provides a staggered magnetic path for completing a magnetic circuit interconnecting adjacent stator rings.

8. The flywheel assembly of claim 7 wherein the pole assemblies are affixed to a non-magnetic support structure.

9. The flywheel assembly of claim 8 wherein the hub includes a conical transition piece.

10. The flywheel assembly of claim 9 further including a drag pump situated within the evacuable space.

11. The flywheel assembly of claim 10 wherein the stator includes a stator ring that is an electromagnetic bearing stator.

12. The flywheel assembly of claim 11 wherein the rotor includes an electromagnetic bearing rotor.

* * * * *